US012492729B2

(12) United States Patent
Bortoli et al.

(10) Patent No.: US 12,492,729 B2
(45) Date of Patent: Dec. 9, 2025

(54) ANTI-VIBRATION SUPPORT FOR AN EXTERNAL SPRING APPLIED HYDRAULIC RELEASE BRAKE ASSEMBLY

(71) Applicant: DANA ITALIA S.R.L., Trentino (IT)

(72) Inventors: Andrea Bortoli, Trento (IT); Marco Scopesi, Isera (IT); Davide Deimichei, Trento (IT); Gianluca Terrasi, Dro (IT)

(73) Assignee: DANA ITALIA S.R.L., Arco (IT)

( * ) Notice: Subject to any disclaimer, the term of this patent is extended or adjusted under 35 U.S.C. 154(b) by 419 days.

(21) Appl. No.: 18/157,726

(22) Filed: Jan. 20, 2023

(65) Prior Publication Data

US 2024/0247696 A1    Jul. 25, 2024

(51) Int. Cl.
| | |
|---|---|
| F16D 59/02 | (2006.01) |
| F16D 65/00 | (2006.01) |
| F16D 65/18 | (2006.01) |
| F16D 121/06 | (2012.01) |

(52) U.S. Cl.
CPC ......... F16D 65/0006 (2013.01); F16D 65/18 (2013.01); *F16D 2121/06* (2013.01)

(58) Field of Classification Search
CPC .. F16D 65/0006; F16D 65/0018; F16D 65/18; F16D 59/02; F16D 2121/06; B60T 13/22
USPC ................... 188/73.35, 73.36, 170
See application file for complete search history.

(56) References Cited

U.S. PATENT DOCUMENTS

| | | | |
|---|---|---|---|
| 7,493,994 B2 * | 2/2009 | Plantan ................. | B60T 17/086 188/170 |
| 7,743,894 B2 * | 6/2010 | Scheckelhoff ........ | B60T 17/083 188/170 |
| 8,672,065 B2 | 3/2014 | Beck et al. | |
| 8,763,766 B2 | 7/2014 | Ebner et al. | |
| 8,800,727 B2 * | 8/2014 | Miller ................... | F16D 65/186 188/71.6 |
| 9,102,206 B1 * | 8/2015 | Saieg ...................... | F16D 65/28 |
| 9,714,040 B2 * | 7/2017 | Asano .................... | B61H 13/00 |
| 9,829,056 B2 | 11/2017 | Peschel et al. | |
| 10,343,668 B2 * | 7/2019 | Fulton ................... | B60G 7/001 |
| 11,173,881 B2 * | 11/2021 | Kasuga ............... | F16D 55/2255 |
| 2006/0131116 A1 * | 6/2006 | Plantan ................. | B60T 17/083 303/7 |
| 2008/0067017 A1 * | 3/2008 | Scheckelhoff .......... | F16D 65/28 188/170 |
| 2014/0231192 A1 * | 8/2014 | Asano ...................... | B61H 1/00 188/74 |
| 2015/0014512 A1 | 1/2015 | Pierce et al. | |
| 2015/0232077 A1 * | 8/2015 | Gaufin .................. | B60T 17/088 188/1.11 R |
| 2016/0010709 A1 * | 1/2016 | Banks ..................... | F16D 65/60 188/234 |

(Continued)

*Primary Examiner* — Thomas W Irvin

(74) *Attorney, Agent, or Firm* — McCoy Russell LLP

(57) ABSTRACT

Examples of a brake assembly including an anti-vibration support to reduce vertical oscillation of a brake actuator are disclosed herein. In one example, a brake assembly includes a spring-applied, hydraulic release (SAHR) brake actuator coupled to a caliper and cantilevered over an axle housing, and an anti-vibration bracket that terminates at the SAHR brake actuator at a first end and extends under the SAHR brake actuator at an angle relative to the SAHR brake actuator.

19 Claims, 7 Drawing Sheets

(56) References Cited

U.S. PATENT DOCUMENTS

2017/0259800 A1\* 9/2017 Fulton ................... B60B 35/005
2020/0101947 A1\* 4/2020 Kasuga ................... B60T 1/065

\* cited by examiner

ANTI-VIBRATION SUPPORT FOR AN EXTERNAL SPRING APPLIED HYDRAULIC RELEASE BRAKE ASSEMBLY

TECHNICAL FIELD

The present description relates generally to a brake assembly in a vehicle. More specifically, the present disclosure relates to a brake assembly with an external spring-applied, hydraulic release actuator and an anti-vibration support.

BACKGROUND AND SUMMARY

Spring-applied, hydraulic release (SAHR) brake assemblies are commonly used for parking brake systems or stop brake systems. A SAHR brake assembly typically includes brake pads, a caliper, and an actuator housing a piston, one or more springs, and an inlet for hydraulic fluid. The one or more springs may provide the force needed to hold the brakes in the engaged position. In order to release the brakes, hydraulic fluid may be flown into the SAHR actuator to provide an opposing force to the one or more springs. As such, if hydraulic pressure is lost (e.g., when the vehicle is shut off) there is no force to oppose the spring force and the brakes are automatically engaged.

SAHR brake assemblies are often utilized in off-highway vehicles, such as those operated in quarries, construction sites, or open fields. Many of the environments that vehicles fitted with SAHR brake assemblies may encounter have uneven and/or unpaved working paths. Typically, such vehicles are also not fitted with suspensions. The harsh working environment and lack of suspension may lead the driveline of an off-highway vehicle to sustain vibrations and impacts throughout daily working conditions. If not properly taken into account, such vibrations and impacts may degrade components of the vehicle driveline or other vehicle subsystems, such as the braking system.

In one example, the issues described above may be addressed by a brake assembly including a spring-applied, hydraulic release (SAHR) brake actuator coupled to a caliper and cantilevered over an axle housing, and an anti-vibration bracket that terminates at the SAHR brake actuator at a first end and extends under the SAHR brake actuator at an angle relative to the SAHR brake actuator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
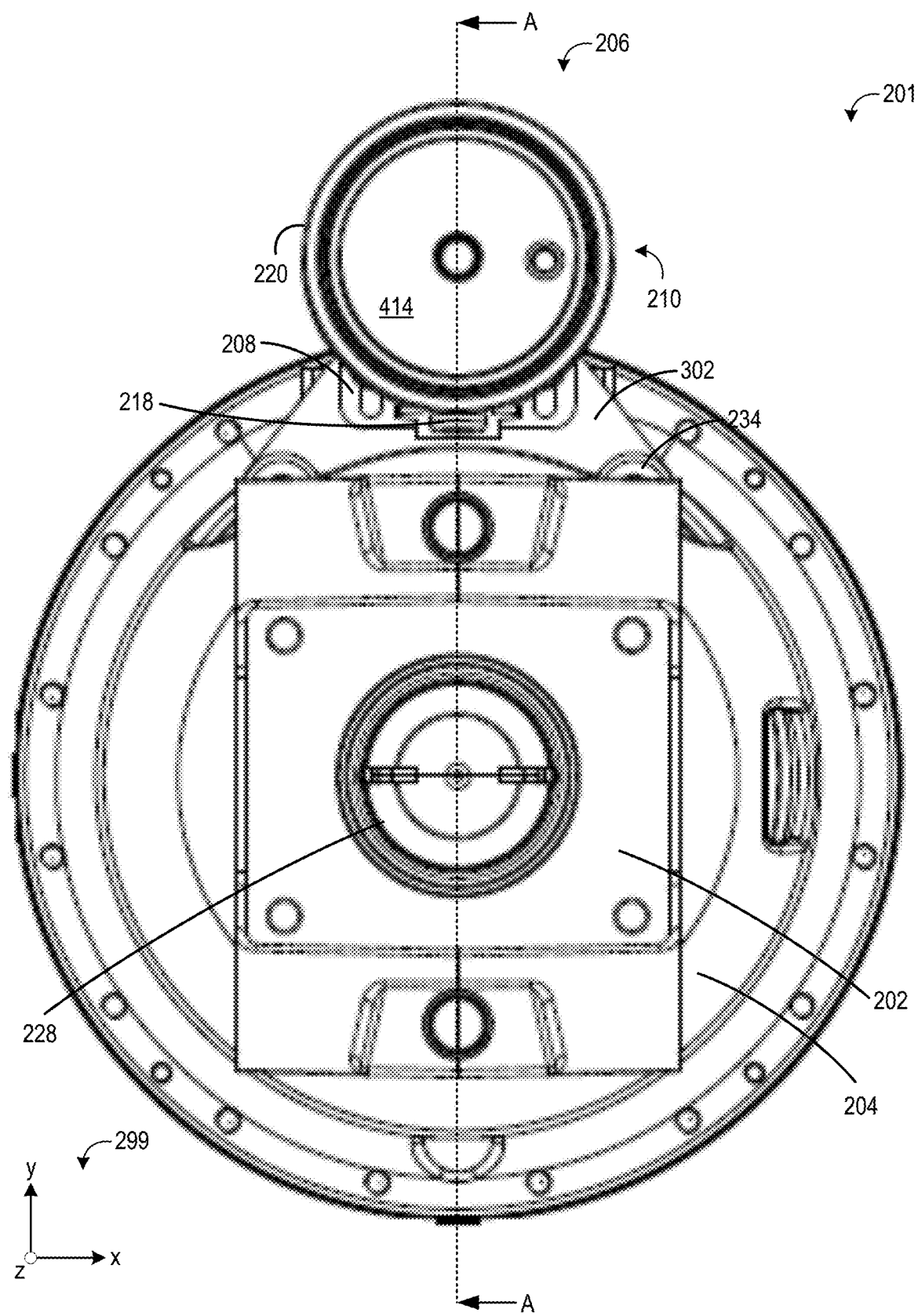
FIG. 2 is a front view of an example brake system including a brake assembly coupled to an axle housing, with the brake assembly including a spring applied hydraulic release (SAHR) break actuator and an anti-vibration support.
Figure 3:
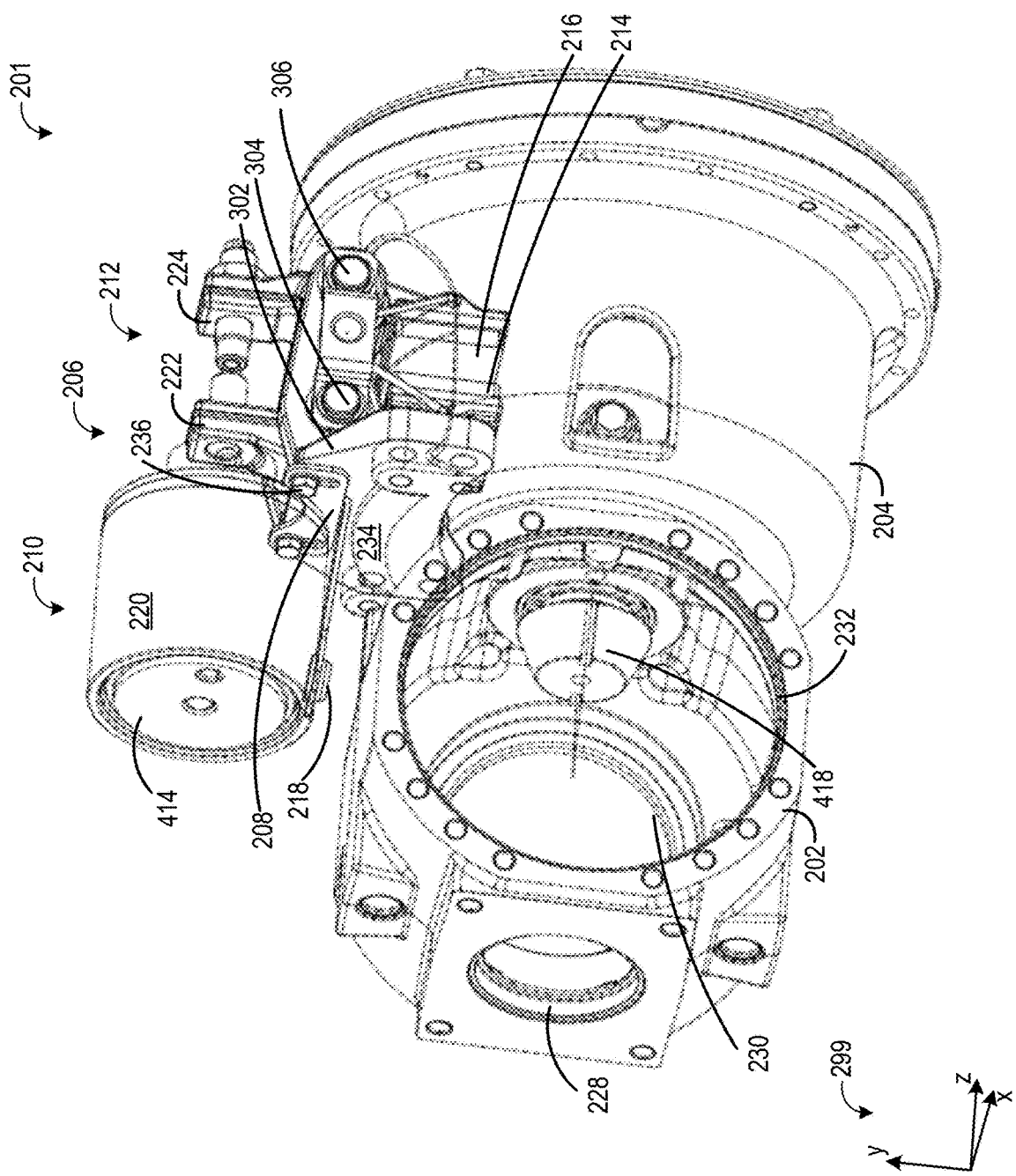
FIG. 3 is a side perspective view of the example brake system of FIG. 2.
Figure 4:
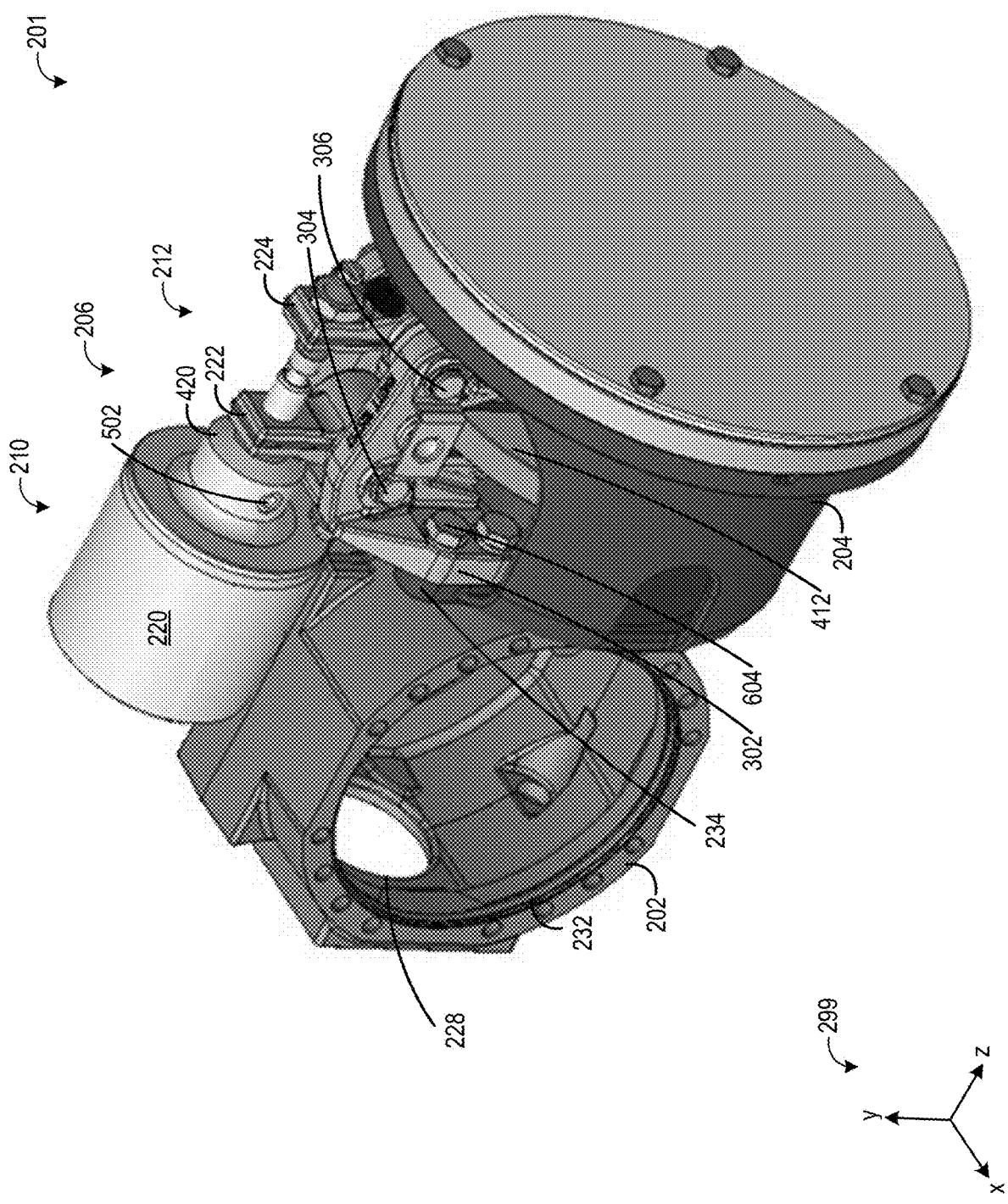
FIG. 4 is a rear perspective view of the brake system of FIG. 2.
Figure 5:
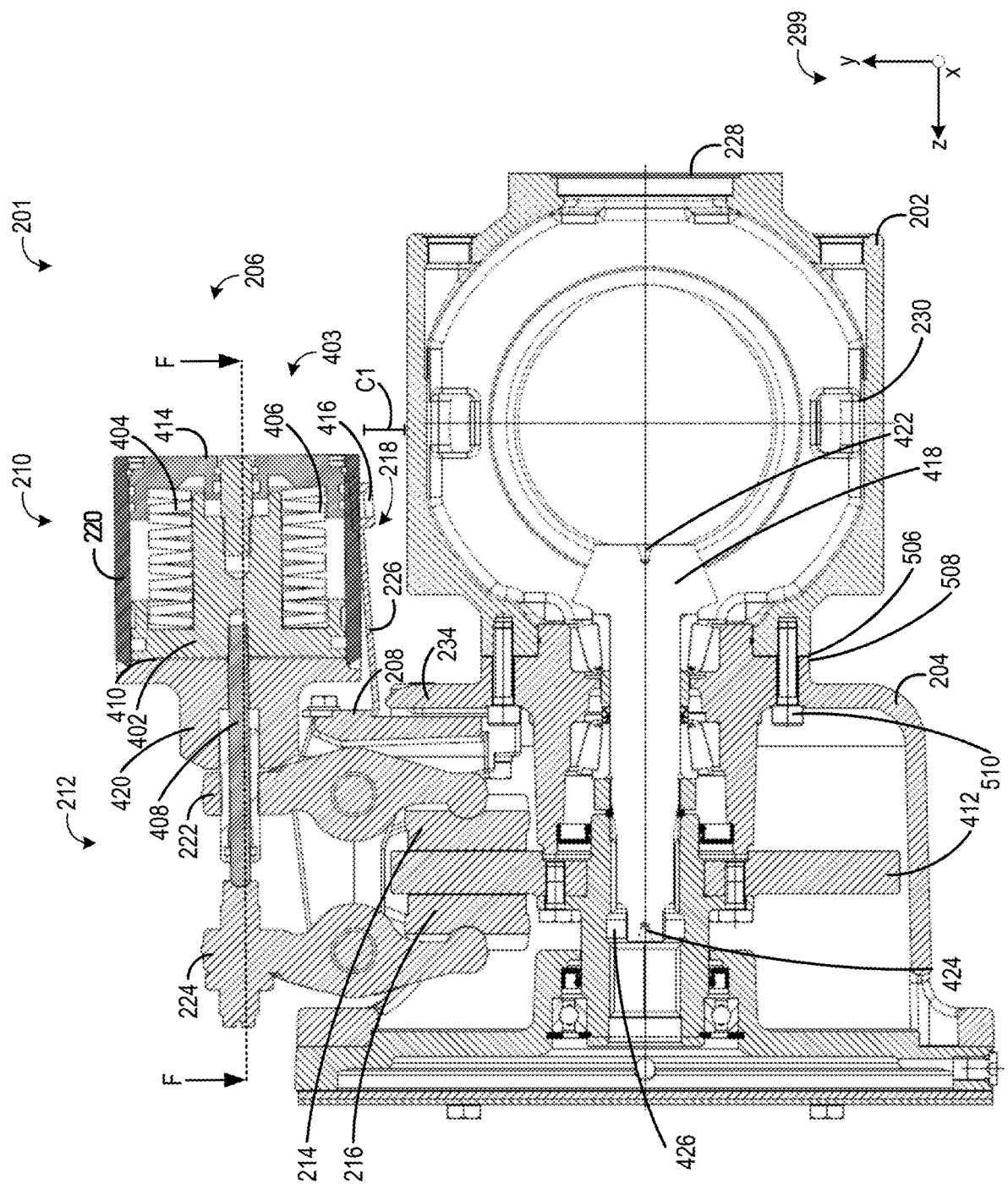
FIG. 5 is a cross-sectional view of the example brake system of FIG. 2.
Figure 6:
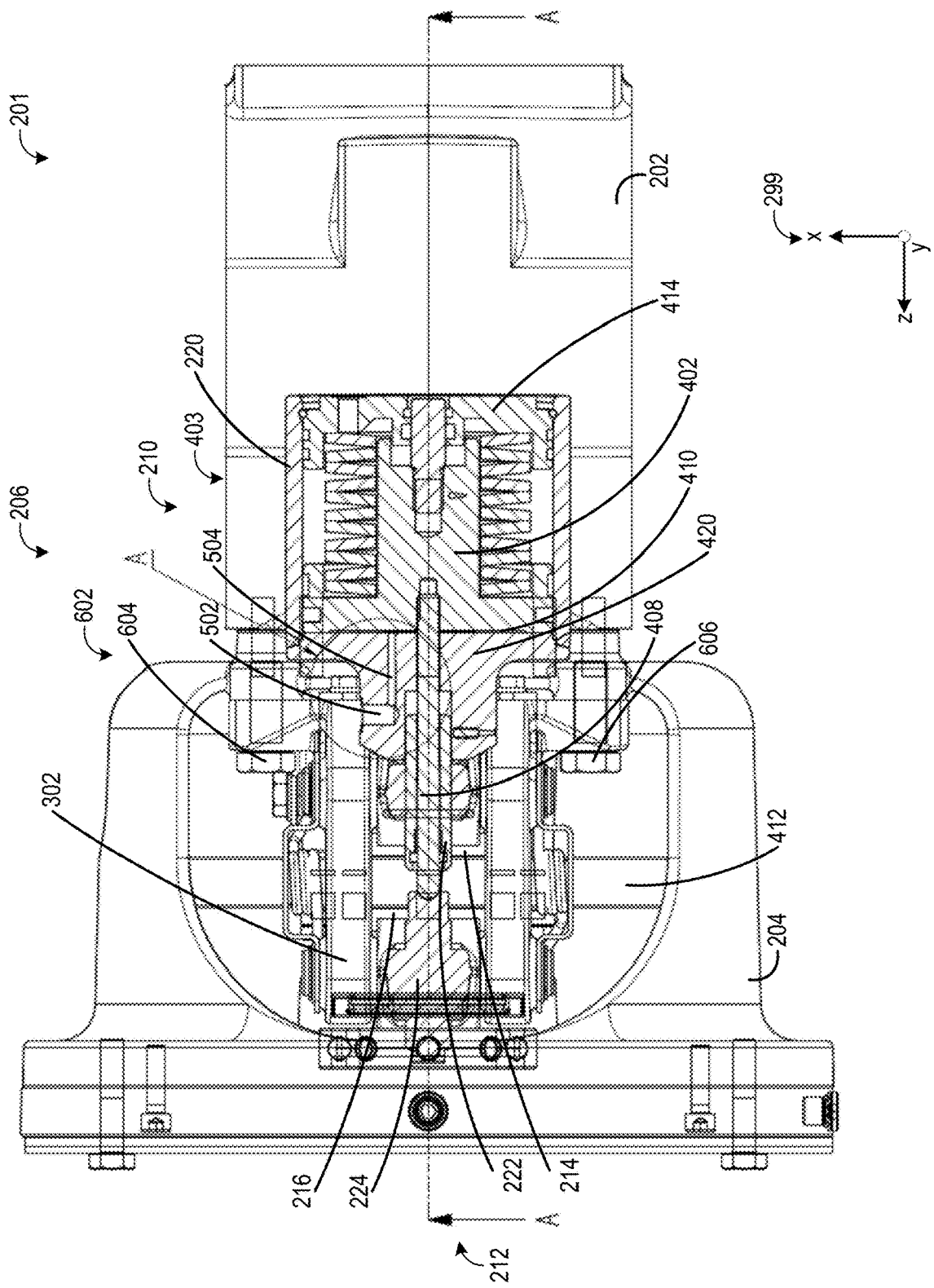
FIG. 6 is a second cross-sectional view of the example brake system of FIG. 2.
Figure 7:
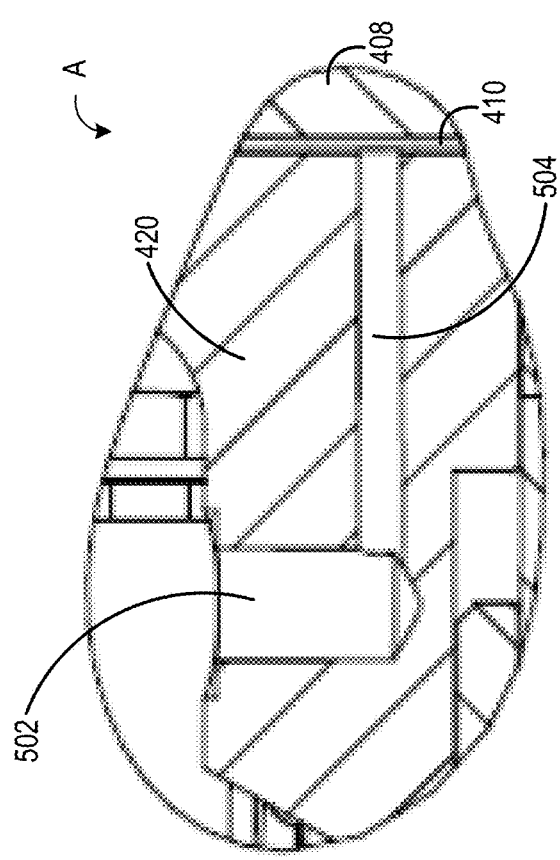
FIG. 7 is a zoomed in view of a hydraulic passage of the brake system of FIG. 6.

The following description relates to a spring-applied, hydraulic release (SAHR) brake assembly with an anti-vibration support. A vehicle, such as the vehicle shown by FIG. 1, includes a brake assembly, such as the brake assembly shown by FIGS. 2-6. The brake assembly may include a brake shaft housing coupled to an axle central housing, as well as a SAHR brake actuator positioned outside of the brake shaft housing. The SAHR brake actuator may engage or release brake pads in the brake shaft housing via a caliper to control rotation of an input shaft housed in the axle central housing and coupled to a rotatable brake shaft in the brake shaft housing. The SAHR brake actuator may be coupled to the brake shaft housing via a brake mount, as shown in FIG. 4, and the SAHR brake actuator may be cantilevered over the axle central housing, as shown in FIGS. 2-6. The SAHR brake actuator may drive the brake assembly to engage and disengage in braking maneuvers through a plurality of springs, a piston, a rod, and a hydraulic system, as shown in FIGS. 5-7.

During vehicle operation, vibrations coming from rough terrain may induce vertical oscillations of the SAHR brake actuator, with the vibrations being amplified at the end of the SAHR brake actuator that is distal to the brake mount. The vertical oscillations of the SAHR brake actuator may lead to rotational oscillations of the brake caliper, and therefore induce involuntary braking maneuvers. Involuntary braking maneuvers may cause brake overheating and brake performance degradation due to increased wear on the brake pads and brake disc coupled to the rotatable brake shaft.

Thus, according to embodiments disclosed herein, the number and magnitude of vertical oscillations experienced by the SAHR brake actuator may be reduced through the use of an anti-vibration support. The anti-vibration support may include a bracket positioned under the SAHR actuator housing and extending at an angle from the brake mount to a distal end of the SAHR actuator housing (e.g., distal to the brake mount/brake shaft housing) to provide a vertical pre-load of force on the distal end of the SAHR brake actuator, as shown in FIGS. 2, 3, and 5, which may increase the magnitude of force required to induce vertical oscillations of the SAHR brake actuator. Additionally, the anti-vibration support may include a rubber tip, which may be in face sharing contact with the SAHR brake actuator. As such, more high frequency vibrations that may induce vertical oscillations of the SAHR brake actuator may be absorbed.

Figure 1:
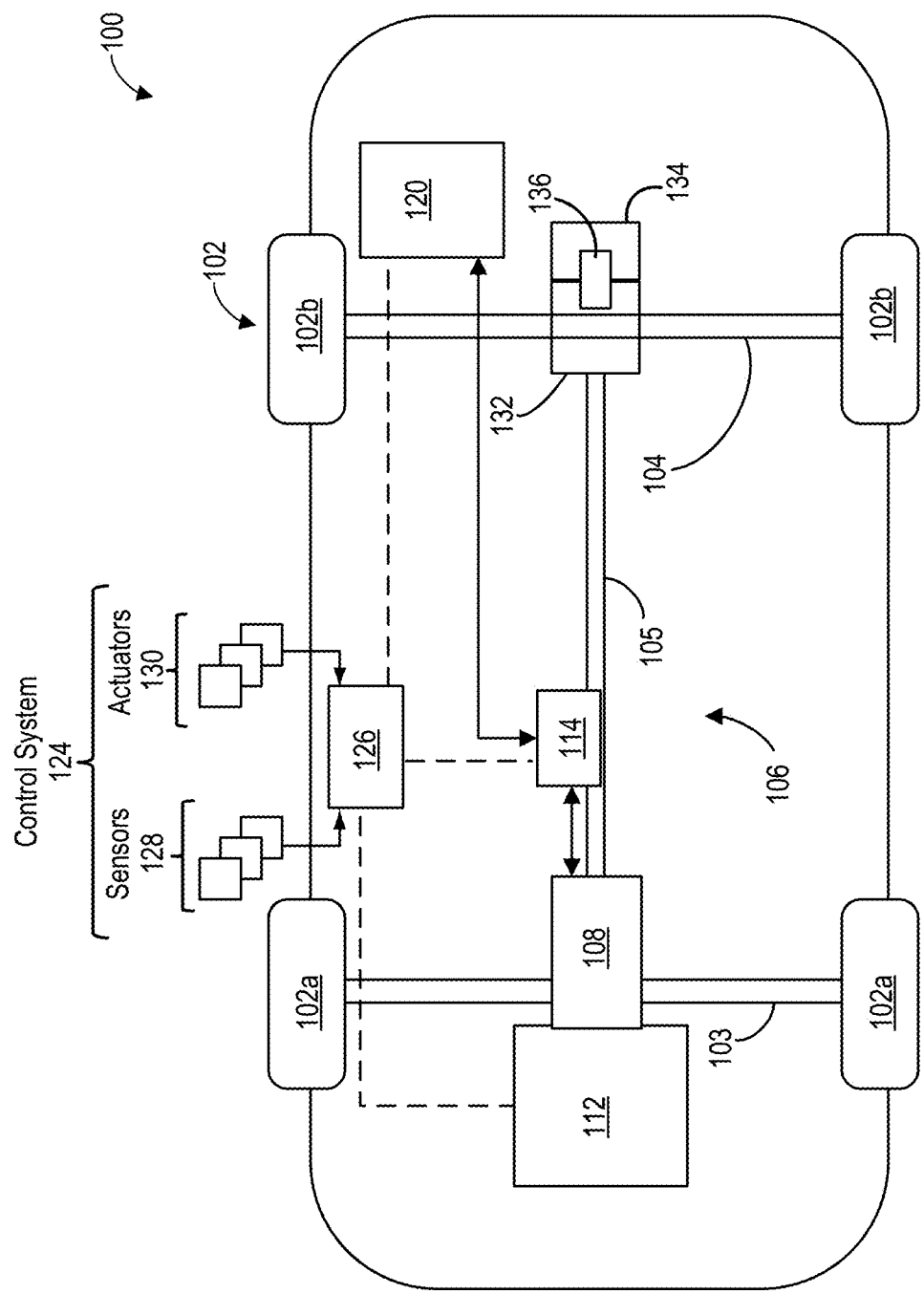
FIG. 1 is a schematic diagram of a vehicle including an axle central housing and a brake assembly.

Referring to FIG. 1, a schematic representation of a vehicle 100 is depicted. It will be appreciated that vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1 for brevity. Vehicle 100 may be an internal combustion engine (ICE) vehicle, a hybrid electric vehicle (HEV), as shown in FIG. 1, or an all-electric vehicle (EV). Vehicle 100 includes wheels 102, e.g., front wheels 102a and rear wheels 102b, with the front wheels 102a coupled by a front axle 103 and the rear wheels 102b coupled by a rear axle 104. As shown in FIG. 1, the vehicle 100 may be configured with rear-wheel drive but other examples include vehicles with front-wheel drive, four-wheel drive or all-wheel drive.

A drive train 106 of vehicle 100 may include a transmission 108 (e.g., a gear box, gear train, etc.) configured to receive torque input from a rotating source and output torque to a drive shaft 105. In some configurations, the rotating source may be an engine 112. In other configurations, the vehicle 100 may have more than one rotating source, including the engine 112 and an electric machine 114. In yet other configurations, engine 112 may be omitted and at least one additional electric machine may be incorporated. In some examples, the electric machine 114 may be a motor/generator, with a capacity to convert electrical energy into mechanical energy and vice versa. As such, the electric machine 114 may be electrically coupled to a traction battery 120 of vehicle 100 to both draw power from the traction battery 120 and generate electrical energy to be stored at the traction battery 120.

The drive shaft 105 may extend between the transmission 108 and a differential, which is engaged by the transmission 108 to output torque. In some examples, the differential may be positioned within an axle central housing 132. The output torque may be moderated based on selective adjustments to gear engagement at the transmission 108 to accommodate desired vehicle operation. Rotation of the drive shaft 105 drives rotation of various gears, such as side gears, pinion gears, etc., of the differential, which is transferred to rotation of the rear axle 104.

In this way, the transmission 108 may transmit torque output from the rotating source to the wheels 102 to enable vehicle motion. In one example, the transmission 108 may be an in-line transmission, e.g., an input/output shaft of the transmission is aligned with an output shaft of the rotating source(s), which may be configured with a planetary gear system. The planetary gear system may include various gears and components, such as a ring gear, a sun gear, planetary gears, and a carrier, and vehicle speed may be controlled based on selective engagement of the gears and components with one another.

The rear axle 104 may extend through the axle central housing 132. The drive shaft 105 may be coupled to the rear axle 104 within the axle central housing 132 and may be configured to transmit rotational force to the rear axle 104 to drive the rear wheels 102b. The vehicle 100 further includes a brake assembly 136 coupled to the axle central housing 132 and configured to stop rotation of the drive shaft 105 in order to brake the vehicle. The brake assembly 136 may include a spring-actuated, hydraulic release (SAHR) brake actuator. The brake actuator of the brake assembly 136 may engage a disc brake which is attached to a rotatable brake shaft housed within a brake housing 134 and coupled to the drive shaft 105. During conditions in which braking of the vehicle 100 is desired, a set of brake pads of the brake assembly 136 may be pressed onto the brake disc via the brake actuator to reduce rotation of the drive shaft 105 and the rear axle 104, as described further below.

In some examples, the electric machine 114 may be directly mounted on the axle central housing 132 and vehicle 100 may not include drive shaft 105. As such, the electric machine 114 may drive the rear axle 104 via an output shaft. Rotation of the output shaft of the electric machine 114 may drive rotation of various gears, such as side gears, pinion gears, etc., of the differential, which is transferred to rotation of the rear axle 104. The output shaft of the electric machine 114 may be coupled to the rear axle 104 within the axle central housing 132 and may be configured to transmit rotational force to the rear axle 104 to drive the rear wheels 102b. The brake actuator of the brake assembly 136 may engage a disc brake which is attached to a rotatable brake shaft housed within a brake housing 134 and coupled to the output shaft of the electric machine 114. During conditions in which braking of the vehicle 100 is desired, a set of brake pads of the brake assembly 136 may be pressed onto the brake disc via the brake actuator to reduce rotation of the output shaft of the electric machine 114 and the rear axle 104, as described further below.

Vehicle 100 may further include a control system 124, including a controller 126, sensors 128, and actuators 130. Controller 126 may be a microcomputer, including elements such as a microprocessor unit, input/output ports, an electronic storage medium for executable programs and calibration values, e.g., a read-only memory chip, random access memory, keep alive memory, and a data bus. In one example, controller 126 may be a powertrain control module (PCM).

Controller 126 may receive various signals from sensors 128 coupled to various regions of vehicle 100. For example, the sensors 128 may include position sensors coupled to the transmission 108 and/or the brake assembly 136, engine sensors for monitoring engine speed, temperature, air mass flow, etc., sensors coupled to the traction battery 120 for measuring a battery state of charge and temperature, and sensors coupled to the electric machine 114 for monitoring a status of the electric machine 114. Upon receiving the signals from one or more of the sensors 128 of FIG. 1, controller 126 processes the received signals, and employs one or more of the actuators 130 of vehicle 100 to adjust engine and drive train operations based on the received signals as well as instructions stored at a memory of controller 126.

FIGS. 2-7 show multiple views of a brake system 201, and will be described collectively. FIG. 2 shows a front view of the brake system 201. FIG. 3 shows a side view of the brake system 201. FIG. 4 shows a rear view of the brake system 201. FIG. 5 shows a cross sectional area taken from line A to A of FIG. 2 of the brake system 201. FIG. 6 shows a cross sectional area of the brake system 201 of FIG. 2 taken from line F to F in FIG. 5. FIG. 7 shows a zoomed in view of a hydraulic passage of the brake system 201 from FIG. 6. FIGS. 2-7 are shown to scale, though other relative dimensions may be used.

FIGS. 2-6 include a Cartesian coordinate system 299 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

The brake system 201 includes an axle central housing 202 and SAHR brake assembly 206 including a brake shaft housing 204 coupled to the axle central housing 202. The axle central housing 202 is a non-limiting example of the axle central housing 132 of FIG. 1. The axle central housing 202 may be shaped and positioned to house an input shaft and an axle (e.g., drive shaft 105 and rear axle 104 of FIG. 1), as well as other components, such as a differential, axle bearings, axle bushings, and/or other driveline components. Additionally, the axle central housing 202 may provide structural support to one or more driveline components and/or shield one or more driveline components from debris.

As shown in FIG. 3, the axle central housing 202 includes a front opening 228 on a front side of the axle central housing 202 (opposite a back side where the axle central housing 202 couples to the brake shaft housing 204). The front opening 228 is configured to accommodate an input shaft (such as drive shaft 105 of FIG. 1). The axle central housing 202 also include two side openings, a first side opening 230 on a first side of the axle central housing 202 and a second side opening 232 on a second side of the axle central housing 202, opposite the first side. An axle, such as rear axle 104 of FIG. 1, may extend through each of the side openings.

The axle central housing 202 may be aligned with the brake shaft housing 204 along the z-axis. The axle central housing 202 may have a mounting surface 506 (shown in FIG. 5) that is in face sharing contact with a corresponding mounting surface 508 of the brake shaft housing 204. The axle central housing 202 may be coupled to the brake shaft housing 204 via a plurality of bolts, such as bolt 510, or other coupling hardware, that pass through the aforementioned mounting surfaces.

A brake shaft 418 may be housed within the brake shaft housing 204 and extend into the axle central housing 202. The brake shaft 418 may have a longitudinal axis aligned with the z-axis. The brake shaft 418 may have a first end 422 configured to couple to the input shaft in the axle central housing 202. Due to the coupling between the brake shaft 418 and the input shaft, the brake shaft 418 may rotate with the input shaft. As shown in FIG. 4, a brake disc 412 may extend outward and around the brake shaft 418 within the brake shaft housing 204. The brake shaft 418 may pass through the center of the brake disc 412, relative to the x-y plane, and the brake disc 412 may be coupled to the brake shaft 418 in such a way that the brake disc 412 and the brake shaft 418 rotate around the longitudinal axis of the brake shaft 418 together. The brake shaft 418 may have a second end 424 coupled to a bearing 426 inside of the brake shaft housing 204. The bearing 426 may allow the brake shaft 418 to freely rotate around an axis parallel to the z-axis.

The SAHR brake assembly 206 may further include a SAHR actuator 210, an actuator head 420, a caliper 212 comprised of a first caliper arm 222 and a second caliper arm 224, a first brake pad 214, and a second brake pad 216. The first brake pad 214, the second brake pad 216, and at least a part of the caliper 212, including the first caliper arm 222 and the second caliper arm 224, may be positioned inside of the brake shaft housing 204. The brake disc 412 may be positioned between the first brake pad 214 and the second brake pad 216 with respect to the z-axis such that the second brake pad 216 may be moved closer to the first brake pad 214 to increase the amount of friction between the brake disc 412 and the brake pads.

The brake shaft housing 204 may include an extension 234 (shown in FIG. 3) that is positioned above the mounting surface 508, relative to the y-axis. The extension 234 may be seamlessly coupled to the brake shaft housing 204 and extend upwards (e.g., parallel to the y-axis) from the brake shaft housing 204. A brake mount 302 may be coupled to the extension 234 via a plurality of bolts 602, such as a first bolt 604 and a second bolt 606. A portion of the brake mount 302 may be in face sharing contact with the extension 234 and the brake mount 302 may be coupled to the side of the extension 234 that is opposite the axle central housing 202, relative to the z-axis.

The brake mount 302 may couple to the caliper 212 via two bolts, a first bolt 304 and a second bolt 306, each of which may have a longitudinal axis parallel to the x-axis. Each bolt may extend through one of the caliper arms, with their longitudinal ends extending outside of the brake mount 302. In some examples, each bolt may be held in place by a bracket positioned around the longitudinal ends of each bolt. The bracket may be coupled to the surface of the brake mount 302 that faces the positive x-direction. The first bolt 304 may extend through the first caliper arm 222 and provide a pivot axis which the first caliper arm 222 may pivot around, and the second bolt 306 may extend through the second caliper arm 224 and provide a pivot axis which the second caliper arm 224 may pivot around. As such, each of the first caliper arm 222 and the second caliper arm 224 may pivot around a respective pivot axis. In this way, the first bolt 304, the second bolt 306, and the brake mount 302 may prevent translational movement but allow rotational movement of each caliper arm around axes parallel to the x-axis. As such, the caliper 212 may still drive the first brake pad 214 and the second brake pad 216 to engage the brake disc 412.

As seen in FIG. 5, the SAHR actuator 210 may include a piston 402, a plurality of springs 403, a rod 408, and a fluid cavity 410 at least partially housed within an inner volume of a SAHR actuator housing 220. The SAHR actuator housing 220 may be a cylinder with its axis parallel to the z-axis.

As shown, the SAHR actuator 210 may be attached to the caliper 212 via a threaded screw. The threaded screw may couple the actuator head 420 to the rest of the SAHR brake assembly 206 via the caliper 212. The SAHR actuator 210 may extend along the z-axis away from the caliper 212 and the threaded screw such that the SAHR actuator 210 is cantilevered over the top of the axle central housing 202. In some examples, the SAHR actuator 210 may extend out over the axle central housing 202 along at least a third of the length of the axle central housing 202, relative to the z-axis. As such, there may be a clearance C1 of 3-4 cm between the bottom of the SAHR actuator housing 220 and the top of the axle central housing 202, relative to the y-axis. In some examples, the clearance C1 may allow space for additional parts (not illustrated), such as wires or intermediate tubing, or provide a space for installation and/or maintenance of the brake system 201. In some examples, the clearance C1 may be less than 3 cm or more than 4 cm, depending on the packaging solution utilized for a vehicle. The SAHR actuator 210 being positioned outside of the axle central housing 202 may allow for brake maintenance with less disassembly of the axle from the vehicle. Similarly, the position of the SAHR actuator 210 may reduce the cost and complexity involved in integrating the SAHR actuator 210 inside of, or mounting the SAHR actuator 210 in direct face sharing contact with, the axle central housing 202.

The SAHR actuator 210 includes a SAHR plate 414 that forms an external front face of the SAHR actuator 210 opposite to the actuator head 420. Each spring of the plurality of springs 403 may be coupled to the SAHR plate 414 at one end, and to the piston 402 at the other end. The furthest backward point, relative to the z-axis, of each of the springs in the plurality of springs 403 may be coupled to the inside surface of a SAHR plate 414. (e.g., the furthest backward point, relative to the z-axis, of the first spring 404 and the furthest backward point, relative to the z-axis, of the second spring 406 may each be coupled to the inside surface of a SAHR plate 414). The furthest forward point, relative to the z-axis, of each of the springs in the plurality of springs 403 may be coupled to the piston 402 (e.g., the furthest forward point, relative to the z-axis, of the first spring 404 and the furthest forward point, relative to the z-axis, of the second spring 406 may each be coupled to the piston 402).

The plurality of springs 403, including the first spring 404 and the second spring 406, may each apply a pushing force on both the piston 402 and the SAHR plate 414 along an axis that is parallel to the z-axis. The SAHR plate 414 may be coupled to the SAHR actuator housing 220 and have a fixed position. As such, the force applied by the plurality of springs 403 may move the piston 402 along an axis parallel to the z-axis and displace the rod 408 in the positive-z direction along the same axis. The rod 408 may be displaced along an axis parallel to the z-axis to a first position and push on the top of the second caliper arm 224. The second caliper arm 224 may rotate in the y-z plane (e.g., clockwise around an axis parallel to the x-axis) and cause the second brake pad 216 to come into contact with the brake disc 412. In this way, the plurality of springs 403 may drive the SAHR brake assembly 206 in preventing the brake disc 412, and therefore the brake shaft 418, from rotating.

The fluid cavity 410 may be an inner volume within the SAHR actuator housing 220 that is configured to hold fluid. The fluid cavity 410 may be positioned between the piston 402 and the actuator head 420 such that the volume of the fluid cavity 410 may increase as the piston 402 moves away from the actuator head 420 along an axis parallel to the z-axis. Hydraulic fluid may enter and exit the fluid cavity 410 through a hydraulic fluid passage 504 (shown in FIG. 6) within the actuator head 420. As illustrated in FIGS. 4, 6, and 7, the hydraulic fluid passage 504 may connect a hydraulic fluid inlet 502 to the fluid cavity 410. In this way, hydraulic fluid may be pumped through the hydraulic fluid inlet 502 and into the fluid cavity 410 via the hydraulic fluid passage 504.

As the amount of hydraulic fluid that is pumped into the fluid cavity 410 increases, the hydraulic pressure within the fluid cavity 410 may also increase. The hydraulic pressure present within the fluid cavity 410 may provide an opposing force to the first spring 404 and the second spring 406 along the z-axis and therefore may push the piston 402 in the direction of the SAHR plate 414 along an axis that is parallel to the z-axis. In this way, the hydraulic force provided by the fluid in the fluid cavity 410 may displace the piston 402 in the direction opposite of the rod 408. The displacement of the piston 402 may allow the rod 408 to shift in the direction opposite of the caliper 212 along the z-axis to a second position. The second caliper arm 224 may then rotate in the y-z plane (e.g., counterclockwise around an axis parallel to the x-axis) and cause the second brake pad 216 to disengage the brake disc 412. In this way, increased hydraulic pressure in the fluid cavity 410 may allow the brake disc 412, and therefore the brake shaft 418, to rotate freely. As such, when hydraulic pressure is provided to the SAHR actuator 210, the brake assembly is not engaged and the input shaft may be allowed to rotate freely.

As shown in FIG. 3, a bracket mounting flange 208 may be positioned on the front face of the brake mount 302, relative to the z-axis (e.g., towards the axle central housing 202). As such, the bracket mounting flange 208 may be coupled to the brake mount 302 at a higher point than the axle central housing 202 is coupled to the brake shaft housing 204, relative to the y-axis. A plurality of bolts, such as bolt 236, may be used to couple the bracket mounting flange 208 to the brake mount 302. The SAHR actuator 210 in FIG. 3 is partially transparent to allow visualization of features, such as a portion of the bracket mounting flange 208, that are behind the SAHR actuator 210.

An anti-vibration support 218 may be held in place by the bracket mounting flange 208 and the brake mount 302. The anti-vibration support 218 comprises a bracket 226 and a rubber tip 416. In some examples, the bracket 226 may have a width of 35 mm and a height of 120 mm. In other examples, the bracket 226 may have a different suitable width and/or height. The bracket 226 may extend from the bottom (e.g., relative to the y-axis/facing the axle central housing 202) of the SAHR actuator housing 220 to the bottom (e.g., relative to the y-axis) of the bracket mounting flange 208.

The bracket 226 may be comprised of a mounting section, a bent section, and a longitudinal section, with the mounting section being in contact with the bracket mounting flange 208, the longitudinal section being in contact with the SAHR actuator 210, and the bent section in between the mounting section and longitudinal section. The mounting section and the longitudinal section of the bracket 226 may be linear while the bent section of the bracket 226 may create an angle in the range of 60-90 degrees between the mounting section and the longitudinal section. The longitudinal section of the bracket 226 may account for at least 80% of the length of the bracket 226 and may include the rubber tip 416. The mounting section of the bracket 226 may extend between the bracket mounting flange 208 and the brake mount 302 in such a way that the mounting section of the bracket 226 is held in place against the brake mount 302 by the bracket mounting flange 208.

The bracket 226 may be held against the brake mount 302 instead of another surface (e.g., the axle central housing 202) due to rotation that affects the SAHR brake assembly 206 during a braking maneuver. In some examples, the SAHR brake assembly 206 (e.g., the SAHR actuator 210, the brake mount 302, etc.) may move (e.g., rotate) relative to the axle central housing 202 during braking maneuvers. As such, if the bracket 226 was coupled to the axle central housing 202, the bracket 226 may experience forces that would cause the bracket 226 to degrade. Additionally, the bracket 226 being held against the brake mount 302 may reduce the cost and complexity relative to coupling the bracket 226 to a dedicated interface on the axle central housing 202. The longitudinal section of the anti-vibration support 218 may be coupled to the SAHR actuator housing 220 via one or more bolts, or other suitable mounting hardware.

The point at which the longitudinal section of the anti-vibration support 218 is coupled to the SAHR actuator housing 220 may be more than half of the way towards the distal end (e.g., furthest from the bracket mounting flange 208) of the SAHR actuator housing 220 (e.g., a distance of more than 50% of the length of the SAHR actuator housing 220 away from the bracket mounting flange 208 along an axis parallel to the z-axis). For example, the SAHR actuator housing 220 may have a length that extends along the z axis from a proximal end (e.g., at the actuator head 420) to a distal end (e.g., at an outer surface of the SAHR plate 414), and the longitudinal section of the bracket 226 may be coupled to the SAHR actuator housing 220 at a point on the bottom of the SAHR actuator housing 220 that is at least 75% of the length in the negative z direction (e.g., starting from the actuator end), such that the bracket 226 terminates at the point that is closer to the distal end than the proximal end. As illustrated in FIG. 4, the longitudinal section of the anti-vibration support 218 may be coupled to the SAHR actuator housing 220 at a point that is approximately 90% of the way to the distal end of the SAHR actuator housing 220. In some examples, the longitudinal section of the bracket 226 of the anti-vibration support 218 may be coupled to the SAHR actuator housing 220 at a point that is closer to or further from the distal end of the SAHR actuator housing 220.

The longitudinal section of the anti-vibration support 218 may extend from the SAHR actuator housing 220 at an angle within a range of 4-10 degrees relative to the bottom of the actuator housing 220/z-axis. In this way, the end of the longitudinal section of the bracket 226 that is coupled to the SAHR actuator housing 220 may be vertically higher than the end of the longitudinal section of the bracket 226 that is coupled to the bent section of the bracket 226, relative to the y-axis. The angle of the longitudinal section of the anti-vibration support 218, along with the position at which the anti-vibration support 218 is coupled to the brake mount 302, may allow space for the packaging and mounting of additional parts (not illustrated), such as wires or intermediate tubing, and/or provide a space for installation and/or maintenance of the brake system 201. In some examples, each of the mounting positions, the length, and/or the angle of the bracket 226 of the anti-vibration support 218 may different than as described above without departing from the scope of this disclosure.

The rubber tip 416 of the anti-vibration support 218 may be coupled to the end of the bracket 226 that is distal to the bracket mounting flange 208. In some examples, the rubber tip 416 may be molded around the tip of the bracket 226. In other examples, the rubber tip 416 may be coupled to the bracket 226 in another suitable way, such as through clips or fasteners. The top side (e.g., facing away from the axle central housing 202) of the rubber tip 416 may be in face sharing contact with the bottom side (e.g., facing towards the axle central housing 202) of the SAHR actuator housing 220. The rubber tip 416 may at least partially absorb high frequency vertical vibrations that may not be dampened by the bracket 226 of the anti-vibration support 218.

The anti-vibration support 218 may reduce the number and magnitude of vertical vibrations experienced be the SAHR actuator 210 during vehicle operation. Such vibrations may lead to translational movements of the rod 408 parallel to the z-axis, similar to the translation movements of the rod 408 that are driven by the piston 402 or the first spring 404 and the second spring 406. Vertical vibrations of the SAHR actuator 210 may therefore cause the second caliper arm 224 to rotate in the y-z plane and drive the first brake pad 214 and the second brake pad 216 to engage the brake disc 412 (e.g., induce braking of the brake shaft 418). In this way, the anti-vibration support 218 may reduce the number and severity of unwanted braking events.

The disclosure also provides support for a brake assembly, comprising: a spring-applied, hydraulic release (SAHR) brake actuator coupled to a caliper and cantilevered over an axle housing, and an anti-vibration bracket that terminates at the SAHR brake actuator at a first end and extends under the SAHR brake actuator at an angle relative to the SAHR brake actuator. In a first example of the brake assembly, at a second end, the anti-vibration bracket couples to a brake mount configured to position the caliper relative to a brake shaft housing. In a second example of the brake assembly, optionally including the first example, the brake shaft housing at least partially houses a brake disc coupled to a rotatable brake shaft, a set of brake pads, and the caliper, the brake shaft housing configured to couple to an axle housing. In a third example of the brake assembly, optionally including one or both of the first and second examples, the caliper includes a first caliper arm and a second caliper arm, each caliper arm configured to pivot around a respective pivot axis to engage or disengage the set of brake pads from the brake disc, and wherein the SAHR brake actuator is coupled to the first caliper arm. In a fourth example of the brake assembly, optionally including one or more or each of the first through third examples, the anti-vibration bracket extends under the SAHR brake actuator for at least 75% of a length of the SAHR brake actuator. In a fifth example of the brake assembly, optionally including one or more or each of the first through fourth examples, the brake assembly further comprises: a rubber tip positioned between the anti-vibration bracket and the SAHR brake actuator.

The disclosure also provides support for a brake assembly, comprising: a brake shaft housing that at least partially houses a brake disc coupled to a rotatable brake shaft, a set of brake pads, and a caliper, the brake shaft housing configured to couple to an axle central housing, the caliper coupled to the brake shaft housing via a brake mount, a brake actuator coupled to the caliper and configured to extend over the axle central housing, and an anti-vibration support coupled to a bottom of a housing of the brake actuator and coupled to the brake mount. In a first example of the brake assembly, the caliper includes a first caliper arm and a second caliper arm, each caliper arm configured to pivot around a respective pivot axis to engage or disengage the set of brake pads from the brake disc, and wherein the brake actuator is coupled to the first caliper arm. In a second example of the brake assembly, optionally including the first example, the anti-vibration support includes a bracket having a longitudinal section, a mounting section, and a bent section intermediate the longitudinal section and the mounting section, the mounting section coupled to the brake mount and the longitudinal section coupled to the bottom of the housing of the brake actuator. In a third example of the brake assembly, optionally including one or both of the first and second examples, the longitudinal section extends outward from the bent section at an angle relative to the mounting section that is less than 90 degrees but greater than 60 degrees. In a fourth example of the brake assembly, optionally including one or more or each of the first through third examples, the brake actuator is a spring applied, hydraulic release brake actuator. In a fifth example of the brake assembly, optionally including one or more or each of the first through fourth examples, the brake actuator is cantilevered over the axle central housing. In a sixth example of the brake assembly, optionally including one or more or each of the first through fifth examples, the brake actuator is cantilevered over at least a third of a length of the axle central housing. In a seventh example of the brake assembly, optionally including one or more or each of the first through sixth examples, the brake actuator is only coupled to the brake shaft housing via the caliper and the anti-vibration support and no other part of the brake actuator is coupled to the axle central housing or the brake shaft housing.

The disclosure also provides support for a system, comprising: an axle central housing configured to house an input shaft, and a spring applied, hydraulic release (SAHR) brake assembly coupled to the axle central housing and comprising: a brake shaft housing that houses a brake disc coupled to a rotatable brake shaft, a set of brake pads, and a caliper coupled to the brake shaft housing via a brake mount, the brake shaft configured to couple to the input shaft, a SAHR actuator coupled to the caliper and cantilevered over a portion of a top of the axle central housing, and an anti-vibration bracket coupled between a bottom of a housing of the SAHR actuator and the brake mount. In a first example of the system, the SAHR actuator is only coupled to the caliper and the anti-vibration bracket and no other part of the SAHR actuator is coupled to the axle central housing or the SAHR brake assembly. In a second example of the system, optionally including the first example, the SAHR actuator is cantilevered over at least a third of a length of the axle central housing. In a third example of the system, optionally including one or both of the first and second examples, the caliper includes a first caliper arm and a second caliper arm, each caliper arm configured to pivot around a respective pivot axis to engage or disengage the set of brake pads from the brake disc, and wherein the SAHR actuator is coupled to the first caliper arm. In a fourth example of the system, optionally including one or more or each of the first through third examples, the SAHR actuator includes a rod coupled to a piston, the rod extending out from the SAHR actuator housing and through the first caliper arm, and wherein the SAHR actuator further includes one or more springs configured to urge the piston and the rod to a first position to pivot the second caliper arm to engage the set of brake pads with the brake disc. In a fifth example of the system, optionally including one or more or each of the first through fourth examples, the SAHR actuator further includes a hydraulic passage configured to receive hydraulic fluid, and when hydraulic fluid is supplied via the hydraulic passage, the piston is configured to move to a second position where the rod disengages from the second caliper arm to disengage the set of brake pads from the brake disc.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A brake assembly, comprising:
a spring-applied, hydraulic release (SAHR) brake actuator coupled to a caliper and cantilevered over an axle housing; and
an anti-vibration bracket that terminates at the SAHR brake actuator at a first end and extends under the SAHR brake actuator at an angle relative to the SAHR brake actuator, wherein, at a second end, the anti-vibration bracket couples to a brake mount configured to position the caliper relative to a brake shaft housing.

2. The brake assembly of claim 1, wherein the brake shaft housing at least partially houses a brake disc coupled to a rotatable brake shaft, a set of brake pads, and the caliper, the brake shaft housing configured to couple to an axle housing.

3. The brake assembly of claim 2, wherein the caliper includes a first caliper arm and a second caliper arm, each caliper arm configured to pivot around a respective pivot axis to engage or disengage the set of brake pads from the brake disc, and wherein the SAHR brake actuator is coupled to the first caliper arm.

4. The brake assembly of claim 1, wherein the anti-vibration bracket extends under the SAHR brake actuator for at least 75% of a length of the SAHR brake actuator.

5. A brake assembly, comprising:
a spring-applied, hydraulic release (SAHR) brake actuator coupled to a caliper and cantilevered over an axle housing;
an anti-vibration bracket that terminates at the SAHR brake actuator at a first end and extends under the SAHR brake actuator at an angle relative to the SAHR brake actuator; and
a rubber tip positioned between the anti-vibration bracket and the SAHR brake actuator.

6. A brake assembly, comprising:
a brake shaft housing that at least partially houses a brake disc coupled to a rotatable brake shaft, a set of brake pads, and a caliper, the brake shaft housing configured to couple to an axle central housing, the caliper coupled to the brake shaft housing via a brake mount;
a brake actuator coupled to the caliper and configured to extend over the axle central housing; and
an anti-vibration support coupled to a bottom of a housing of the brake actuator and coupled to the brake mount.

7. The brake assembly of claim 6, wherein the caliper includes a first caliper arm and a second caliper arm, each caliper arm configured to pivot around a respective pivot axis to engage or disengage the set of brake pads from the brake disc, and wherein the brake actuator is coupled to the first caliper arm.

8. The brake assembly of claim 6, wherein the anti-vibration support includes a bracket having a longitudinal section, a mounting section, and a bent section intermediate the longitudinal section and the mounting section, the mounting section coupled to the brake mount and the longitudinal section coupled to the bottom of the housing of the brake actuator.

9. The brake assembly of claim 8, wherein the longitudinal section extends outward from the bent section at an angle relative to the mounting section that is less than 90 degrees but greater than 60 degrees.

10. The brake assembly of claim 6, wherein the brake actuator is a spring applied, hydraulic release brake actuator.

11. The brake assembly of claim 6, wherein the brake actuator is cantilevered over the axle central housing.

12. The brake assembly of claim 11, wherein the brake actuator is cantilevered over at least a third of a length of the axle central housing.

13. The brake assembly of claim 6, wherein the brake actuator is only coupled to the brake shaft housing via the caliper and the anti-vibration support and no other part of the brake actuator is coupled to the axle central housing or the brake shaft housing.

14. A system, comprising:
an axle central housing configured to house an input shaft; and
a spring applied, hydraulic release (SAHR) brake assembly coupled to the axle central housing and comprising:
a brake shaft housing that houses a brake disc coupled to a rotatable brake shaft, a set of brake pads, and a caliper coupled to the brake shaft housing via a brake mount, the brake shaft configured to couple to the input shaft;
a SAHR actuator coupled to the caliper and cantilevered over a portion of a top of the axle central housing; and
an anti-vibration bracket coupled between a bottom of a housing of the SAHR actuator and the brake mount.

15. The system of claim 14, wherein the SAHR actuator is only coupled to the caliper and the anti-vibration bracket and no other part of the SAHR actuator is coupled to the axle central housing or the SAHR brake assembly.

16. The system of claim 14, wherein the SAHR actuator is cantilevered over at least a third of a length of the axle central housing.

17. The system of claim 14, wherein the caliper includes a first caliper arm and a second caliper arm, each caliper arm configured to pivot around a respective pivot axis to engage or disengage the set of brake pads from the brake disc, and wherein the SAHR actuator is coupled to the first caliper arm.

18. The system of claim 17, wherein the SAHR actuator includes a rod coupled to a piston, the rod extending out from the SAHR actuator housing and through the first caliper arm, and wherein the SAHR actuator further includes one or more springs configured to urge the piston and the rod to a first position to pivot the second caliper arm to engage the set of brake pads with the brake disc.

19. The system of claim 18, wherein the SAHR actuator further includes a hydraulic passage configured to receive hydraulic fluid, and when hydraulic fluid is supplied via the hydraulic passage, the piston is configured to move to a second position where the rod disengages from the second caliper arm to disengage the set of brake pads from the brake disc.

* * * * *